United States Patent
Terra Rios et al.

(10) Patent No.: US 9,398,095 B2
(45) Date of Patent: Jul. 19, 2016

(54) METHOD IN AN ELECTRONIC MOBILE DEVICE AND SUCH A DEVICE

(71) Applicant: Sony Corporation, Tokyo (JP)

(72) Inventors: Rodrigo Terra Rios, Malmo (SE); Mathias Jensen, Malmo (SE)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 14/345,899

(22) PCT Filed: Dec. 9, 2013

(86) PCT No.: PCT/IB2013/060741
§ 371 (c)(1),
(2) Date: Mar. 19, 2014

(87) PCT Pub. No.: WO2015/087108
PCT Pub. Date: Jun. 18, 2015

(65) Prior Publication Data
US 2015/0163304 A1 Jun. 11, 2015

(51) Int. Cl.
*G06F 15/16* (2006.01)
*H04L 29/08* (2006.01)
*H04W 4/00* (2009.01)
*H04N 1/00* (2006.01)
(Continued)

(52) U.S. Cl.
CPC ........ *H04L 67/1097* (2013.01); *H04L 67/1095* (2013.01); *H04N 1/00114* (2013.01); *H04N 1/00217* (2013.01); *H04N 1/32144* (2013.01); *H04N 1/333* (2013.01); *H04W 4/005* (2013.01); *H04N 2201/0084* (2013.01); *H04N 2201/33307* (2013.01); *H04N 2201/33328* (2013.01)

(58) Field of Classification Search
CPC H04L 67/1097; H04L 67/1095; H04W 4/005
See application file for complete search history.

(56) References Cited

U.S. PATENT DOCUMENTS 6,392,697 B1    5/2002   Tanaka et al.
6,832,102 B2 *  12/2004  I'Anson ............. G06Q 30/0601
                                              348/207.1
(Continued)

FOREIGN PATENT DOCUMENTS

EP          1 672 902 A2    6/2006
WO      WO 02/082799 A2    10/2002

OTHER PUBLICATIONS

International Search Report and Written Opinion of the International Searching Authority, PCT Application No. PCT/IB2013/060741, Mar. 4, 2014.

*Primary Examiner* — Moustafa M Meky
(74) *Attorney, Agent, or Firm* — Myers Bigel & Sibley, P.A.

(57) ABSTRACT

A method in a system for sending a picture from an electronic mobile device to an electronic device is provided. The picture is to be sent over a wireless communications network. The system comprises the electronic mobile device, the wireless communications network, and the electronic device, and the electronic mobile device comprises a camera unit. The camera unit captures a high resolution picture. The electronic mobile device creates a low resolution picture based on the high resolution picture. The electronic mobile device sends the low resolution picture to the electronic device, and, when a quality of resources in the wireless communications network is above a threshold, sends the high resolution picture to at least one database for storage. Further, such a system is provided.

19 Claims, 2 Drawing Sheets

(51) Int. Cl.
*H04N 1/32* (2006.01)
*H04N 1/333* (2006.01)

(56) References Cited

U.S. PATENT DOCUMENTS

| | | | |
|---|---|---|---|
| 7,027,084 B1 | 4/2006 | Watanabe | |
| 7,558,323 B2* | 7/2009 | Aikawa | H04N 7/18 375/240.25 |
| 8,379,065 B2* | 2/2013 | Nam | G06F 3/14 345/3.3 |
| 8,681,856 B2* | 3/2014 | Bae | H04L 65/607 375/240.02 |
| 2001/0026376 A1* | 10/2001 | I'Anson | G06Q 30/0601 358/400 |
| 2004/0105494 A1* | 6/2004 | Aikawa | H04N 7/18 375/240.13 |
| 2005/0052685 A1 | 3/2005 | Herf et al. | |
| 2006/0092266 A1* | 5/2006 | Morgan | H04N 1/32117 348/14.01 |
| 2007/0046698 A1* | 3/2007 | Nam | G06F 3/14 345/660 |
| 2008/0298469 A1* | 12/2008 | Liu | H04N 19/15 375/240.26 |
| 2009/0023429 A1* | 1/2009 | Naaman | G06Q 30/02 455/414.3 |
| 2011/0129164 A1* | 6/2011 | Lin | G06T 3/40 382/254 |
| 2011/0182353 A1* | 7/2011 | Bae | H04L 65/607 375/240.02 |
| 2011/0208927 A1* | 8/2011 | McNamara | G06F 9/5016 711/159 |
| 2011/0289136 A1 | 11/2011 | Klassen | |
| 2012/0324397 A1* | 12/2012 | Patz | G06F 19/321 715/800 |
| 2013/0120591 A1 | 5/2013 | Bednarczyk et al. | |
| 2015/0003668 A1* | 1/2015 | Carper | G06T 1/0028 382/100 |

* cited by examiner

METHOD IN AN ELECTRONIC MOBILE DEVICE AND SUCH A DEVICE

CROSS REFERENCE TO RELATED APPLICATION

This application is a 35 U.S.C. §371 national stage application of PCT International Application No. PCT/IB2013/060741, filed on 9 Dec. 2013, the disclosure and content of which is incorporated by reference herein in its entirety.

TECHNICAL FIELD

Embodiments herein relate to methods in an electronic mobile device for sending a picture over a wireless communications network to an electronic device. Other embodiments herein relate to an electronic mobile device.

BACKGROUND

The performance of cameras are growing in speed and quality, and more and more people are using cameras of their mobile electronic devices as main and only camera for all occasions. However, with high quality come the drawbacks of the size of the pictures taken.

As an example, five pictures taken with a mobile phone camera unit may occupy as much as 10 MB. Thus, when sending pictures as attachments of that size, systems like e-mail systems may refuse to handle the attachments due to poor resources or temporary lack of space in the email accounts. This is becoming a real problem that needs to be addressed with alternative solutions.

Some applications allow a user to modify resolution and quality of a picture right after attaching it to an e-mail and before sending. Although solving the problem of large attachments being difficult for systems to handle, this do not really solve the problem. Once a low resolution picture is selected, the receiver will receive a low resolution picture only, and there is nothing the receiver is able to do to influence the process. The same solution is present in a lot of applications and mobile electronic devices; the quality is selected before a picture is to be sent. If it is selected to take a photo with low quality due to concerns of file size to share over network, that low quality picture could never be enhanced since the quantity of pixels were lower when the picture was taken. Such a picture will never have a high resolution that maybe was wanted, but not chosen to use by the user due to such limitations.

Thus, there is a need of an alternative solution to the problem of sending pictures of high resolution quality occupying large resources in systems available for sending. Further, solutions of today limit a receiver to get what the sender decided.

SUMMARY

An object of embodiments herein is to improve performance when sending pictures from an electronic mobile device over a wireless communications network to an electronic device.

According to some embodiments described herein the object is achieved by a method in a system for sending a picture from an electronic mobile device to an electronic device. The picture is to be sent over a wireless communications network. The system comprises the electronic mobile device, the wireless communications network, and the electronic device, and the electronic mobile device comprises a camera unit. The camera unit captures a high resolution picture. The electronic mobile device creates a low resolution picture based on the high resolution picture. The electronic mobile device sends the low resolution picture to the electronic device, and, when a quality of resources in the wireless communications network is above a threshold, sends the high resolution picture to at least one database for storage.

The above mentioned object is achieved, in another aspect, by a system comprising an electronic mobile device, a wireless communications network, and an electronic device. The electronic mobile device comprises a camera unit adapted to capture a high resolution picture. The electronic mobile device is adapted to send a picture to an electronic device over a wireless communications network. The electronic mobile device is adapted to create a low resolution picture based on the high resolution picture, and is adapted to send the low resolution picture to the electronic device, and, when a quality of resources in the wireless communications network is above a threshold, is adapted to send the high resolution picture to at least one database for storage.

BRIEF DESCRIPTION OF THE DRAWINGS

Examples of embodiments herein are described in more detail with reference to attached drawings in which.

DETAILED DESCRIPTION

Embodiments herein will be exemplified in the following detailed non-limiting description.

Figure 1:
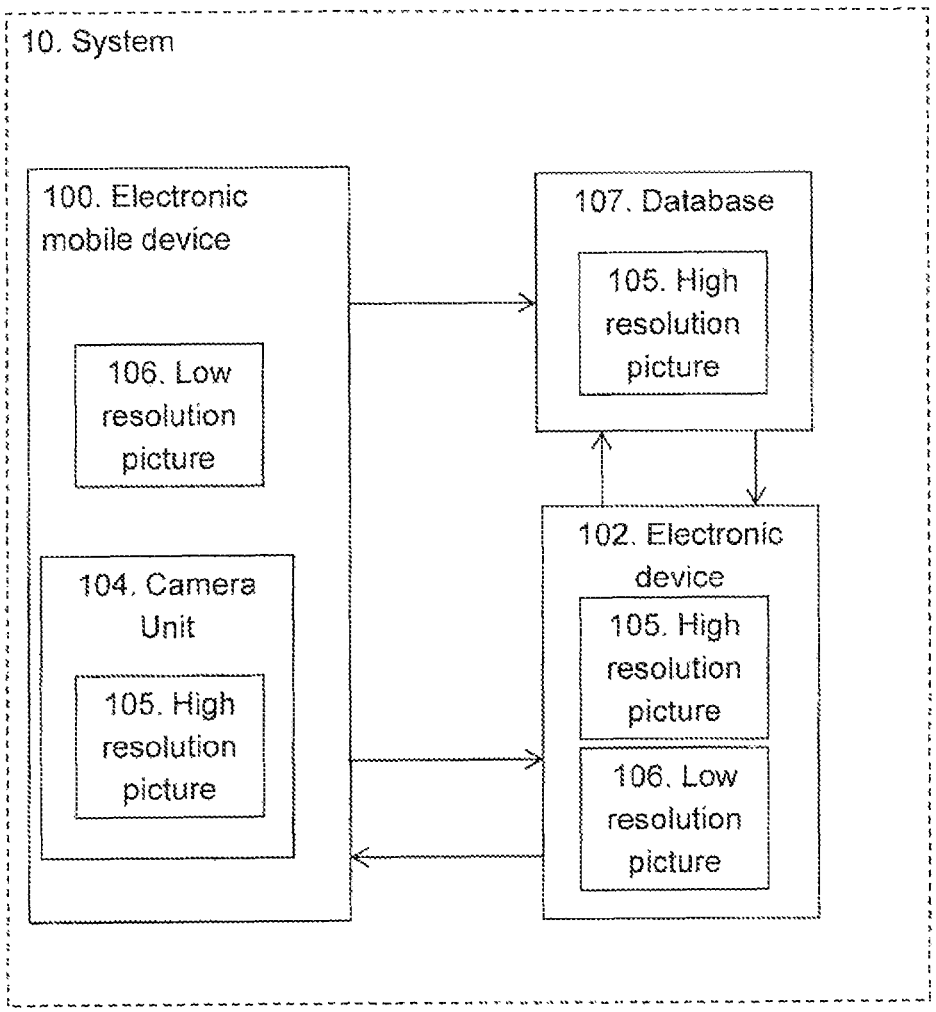
FIG. 1 shows an electronic mobile device in accordance with embodiments herein.

FIG. 1 shows a system 10 in accordance with embodiments herein. The system 10 comprises an electronic mobile device 100, an electronic device 102 and a wireless communications network. The electronic mobile device 100 comprises a camera unit 104 adapted to capture a high resolution picture 105. The electronic mobile device 100 is adapted to send a picture to the electronic device 102 over the wireless communications network. The electronic mobile device 100 is adapted to create a low resolution picture 106 based on the high resolution picture 105, and is adapted to send the low resolution picture 106 to the electronic device 102, and, when a quality of resources in the wireless communications network is above a threshold, is adapted to send the high resolution picture 105 to at least one database 107 for storage. The database 107 may be comprised in a so called cloud. As an example, the cloud may be a computer network comprising one or more computers. A link to the high resolution picture 105 may be embedded in the low resolution picture 106.

Figure 2:
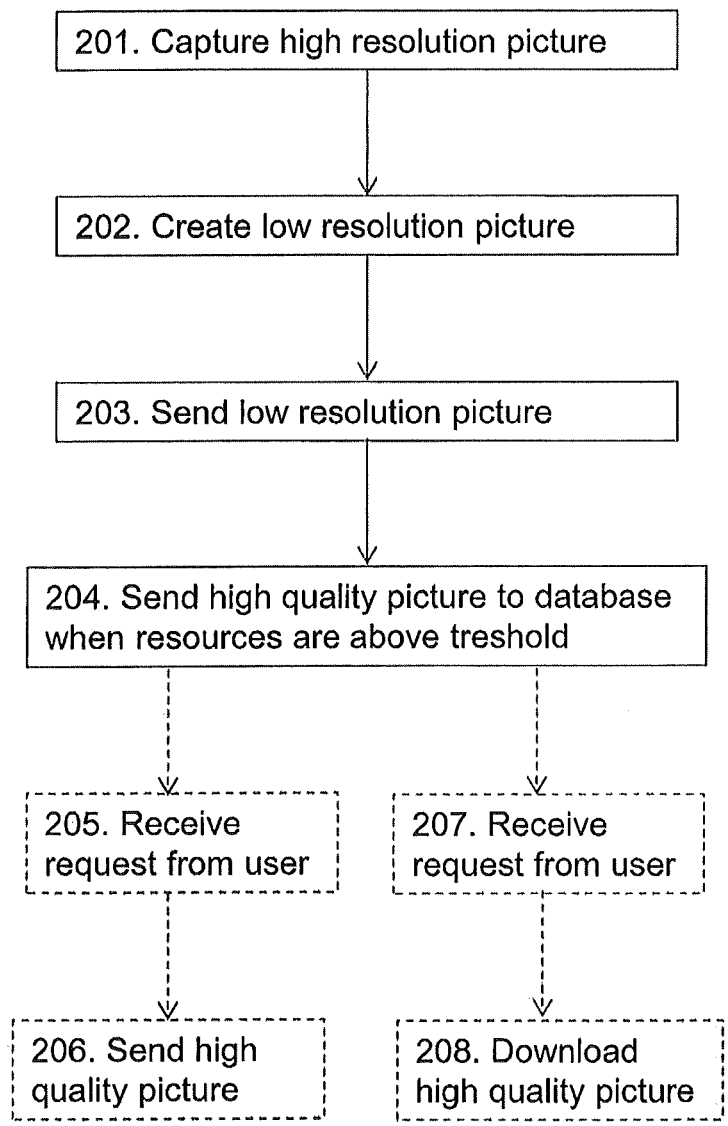
FIG. 2 is a flow chart showing methods herein.

With reference to FIG. 2, a method in the electronic mobile device 100 for sending a picture 105, 106 to an electronic device 102 will now be described.

Action 201

The electronic mobile device 100 captures a high resolution picture 105 with the camera unit 104.

Action 202

The electronic mobile device 100 creates a low resolution picture 106 based on the high resolution picture 105.

Action 203

The electronic mobile device 100 sends the low resolution picture 106 to the electronic device 102. Thereby, a user of the electronic device 102 receives a low quality picture, good enough to look at in a mobile device, pallet, tablet or the like, but still sent as a small attachment.

Action 204

When a quality of resources in the wireless communications network is above a threshold, the electronic mobile device 100 sends the high resolution picture 105 to the at least one database 107 for storage. Thus, traffic on the wireless communications network may be reduced since in some cases a larger file is kept on one server only.

Action 205

The electronic mobile device 100 may receive a request from a user of the electronic device 102 to send a high quality resolution picture.

Action 206

The electronic mobile device 100 may, when the quality of resources in the wireless communications network is above the threshold, send the high resolution picture 105 to the electronic device 102.

Action 206

The electronic mobile device 100 may, on request from the user of the electronic device 102, download the high resolution picture 105 from the at least one database 107 to the electronic device 102. The downloading action may be performed when the quality of resources in the wireless communications network is above the threshold. If a high resolution picture 105 is needed for example for printing purposes, it may be accessed for example via a menu to request back to a server a high resolution version of a picture.

Further, in the previous description specific details have been set forth, such as particular embodiments for purposes of explanation and not limitation. However, it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes, e.g. a wireless modem or a wireless device, using hardware circuitry, e.g., analogue and/or discrete logic gates interconnected to perform a specialized function, ASICs, PLAs, etc., and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory 604, such as solid-state memory, magnetic disk, or optical disk comprising an appropriate set of computer instructions that would cause a processor to carry out the techniques described herein.

Hardware implementation may include or encompass, without limitation, digital signal processor, DSP, hardware, a reduced instruction set processor, hardware, e.g., digital or analogue circuitry including but not limited to Application Specific Integrated Circuits, ASIC, and/or Field Programmable Gate Arrays, FPGAs, and where appropriate state machines capable of performing such functions.

In terms of computer implementation, a computer is generally understood to comprise one or more processors or one or more controllers, and the terms computer, processor, processing unit 601 and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description above comprises many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method in a system for sending a picture from an electronic mobile device to an electronic device, which picture is to be sent over a wireless communications network, the system comprising the electronic mobile device, the electronic device, and the wireless communications network, and
   wherein the electronic mobile device comprises a camera unit the method comprising:
   capturing a high resolution picture with the camera unit,
   creating a low resolution picture in the electronic mobile device based on the high resolution picture,
   sending the low resolution picture from the electronic mobile device to the electronic device, and
   when a quality of resources in the wireless communications network is above a threshold, sending the high resolution picture from the electronic mobile device to the electronic device.

2. The method according to claim 1 further comprising
   receiving in the electronic mobile device a request from the electronic device for the high resolution picture, and,
   wherein the sending of the high resolution picture from the electronic mobile device to the electronic device is responsive to the request.

3. The method according to claim 1 further comprising,
   when a quality of resources in the wireless communications network is above a threshold, sending the high resolution picture from the electronic mobile device to a database for storage,
   receiving in the database a request from the electronic device for the high resolution picture,
   downloading the high resolution picture from the at least one database to the electronic device.

4. The method according to claim 3, wherein the downloading action is performed when the quality of resources in the wireless communications network is above the threshold.

5. The method according to claim 1, wherein a link to the high resolution picture is embedded in the low resolution picture.

6. The method according to claim 1, wherein the quality of resources in the wireless communications network comprises a measure of a capacity of the wireless communications network.

7. The method according to claim 1, wherein the electronic device is a mobile device.

8. The method according to claim 1, wherein sending the low resolution picture from the electronic mobile device to the electronic device comprises sending the low resolution picture from the electronic mobile device directly to the electronic device over the wireless network.

9. The method according to claim 8, wherein sending the high resolution picture from the electronic mobile device to the electronic device comprises sending the high resolution picture from the electronic mobile device directly to the electronic device over the wireless network.

10. The method according to claim 9, wherein sending the high resolution picture directly to the electronic device over the wireless network is performed without sending the high resolution picture to a database for storage.

11. A system comprising:
an electronic mobile device,
a wireless communications network, and
an electronic device,
wherein the electronic mobile device comprises a camera unit,
wherein the camera unit is adapted to capture a high resolution picture,
wherein the electronic mobile device is adapted to send a picture to an electronic device over a wireless communications network,
wherein the electronic mobile device is adapted to create a low resolution picture based on the high resolution picture, and is adapted to send the low resolution picture to the electronic device, and, when a quality of resources in the wireless communications network is above a threshold, is adapted to send the high resolution picture to the electronic device.

12. The system according to claim 11 wherein the electronic mobile device is further adapted to embed a link to the high resolution picture in the low resolution picture.

13. The system according to claim 11 wherein the electronic mobile device is further adapted to receive a request from the electronic device for the high resolution picture, and wherein the sending of the high resolution picture from the electronic mobile device to the electronic device is responsive to the request.

14. The system according to claim 11, wherein the electronic mobile device, when a quality of resources in the wireless communications network is above a threshold, is adapted to send the high resolution picture to a database, wherein the database is adapted to receive a request from the electronic device for the high resolution picture, and wherein the electronic device is adapted to download the high resolution picture from the database.

15. The system according to claim 11, wherein the quality of resources in the wireless communications network comprises a measure of a capacity of the wireless communications network.

16. The system according to claim 11, wherein the electronic device is a mobile device.

17. The system according to claim 11, wherein sending the low resolution picture from the electronic mobile device to the electronic device comprises sending the low resolution picture from the electronic mobile device directly to the electronic device over the wireless network.

18. The system according to claim 17, wherein sending the high resolution picture from the electronic mobile device to the electronic device comprises sending the high resolution picture from the electronic mobile device directly to the electronic device over the wireless network.

19. The system according to claim 18, wherein sending the high resolution picture directly to the electronic device over the wireless network is performed without sending the high resolution picture to a database for storage.

\* \* \* \* \*